United States Patent [19]

Slaback, Jr. et al.

[11] Patent Number: 5,269,088
[45] Date of Patent: Dec. 14, 1993

[54] FISH POLE HOLDING AND SIGNALING DEVICE

[76] Inventors: Theron A. Slaback, Jr., 2411 Wood St.; Gary A. Slaback, 2217 Liberty, both of La Crosse, Wis. 54603

[21] Appl. No.: 961,548

[22] Filed: Oct. 15, 1992

[51] Int. Cl.$^5$ .................... A01K 97/10; A01K 97/12
[52] U.S. Cl. ................................................. 43/17
[58] Field of Search .......................... 43/17, 21.2

[56] References Cited

U.S. PATENT DOCUMENTS

| | | | |
|---|---|---|---|
| 2,923,082 | 2/1960 | Kulow | 43/17 |
| 3,037,314 | 6/1962 | Hardy | 43/17 |
| 3,389,489 | 6/1968 | Burns | 43/17 |
| 3,645,028 | 2/1972 | Rayburn | 43/17 |
| 4,633,608 | 1/1987 | Savarino | 43/17 |
| 4,908,973 | 3/1990 | Perks | 43/17 |
| 5,025,583 | 6/1991 | Langley | 43/17 |
| 5,025,584 | 6/1991 | Butterwick, Sr. | 43/21.2 |

*Primary Examiner*—Mark Rosenbaum
*Assistant Examiner*—Jeanne M. Elpel
*Attorney, Agent, or Firm*—M. Paul Hendrickson

[57] ABSTRACT

The present invention provides a fishing rod and spinning reel holding device equipped to signal a fisherman of a striking fish. The signaling mechanism has a axially mounted crank shaft which directly contacts onto a fishing line on one side of the crank shaft. The other side of the crank shaft is fitted with a hooked retainer for retaining a flagging unit such as a springed flag staff in a non-signaling position. When a striking fish tugs upon the fishing line, the fishing line forces the crank shaft to pivotally move about its axial mount and cause the hooked retainer to release the flagging unit to a flagging position and thus give the signal of the striking fish.

20 Claims, 4 Drawing Sheets

FISH POLE HOLDING AND SIGNALING DEVICE

FIELD OF THE INVENTION

The present invention relates to a signaling device and its use and more particularly to a rod and reel holding device equipped with a signaling unit for signaling a fishing strike.

PRIOR ART

Numerous different devices for holding fishing poles and signaling when a fish strikes a bait have been developed throughout the years. Such fishing pole holding and strike signaling devices are extensively used by ice fishermen in the northern climates.

The patented pole holding and signaling devices are most generally of the type in which tension upon the fishing pole activates a signal. Illustrative of such pole activated signaling devices are U.S. Pat. No. 3,037,314 to Joseph Hardy; U.S. Pat. No. 5,025,583 to Langley; and U.S. Pat. No. 3,645,028 to Donald G. Rayburn. A fishing pole holder equipped with a visual signal triggered by strike of a fish via movement of the reel handle which in turn trips the signal is disclosed in U.S. Pat. No. 2,923,082 to R. Kulov. A fishing rod holder equipped with hinged and collapsible leg and rod support is disclosed in U.S. Pat. No. 2,923,082 to Kulow. There also exist bobbers equipped with a battery operated light signaling device which lights when a fish strikes the bait and tugs upon the fishing line.

There exist a need for pole holding and signaling devices which may be appropriately adjusted to hold and accommodate the various different rod and reel sizes, and equipped with a triggering mechanism for triggering a signal when a fish strikes or tugs upon a fishing line. Such a device would be particularly advantageous if it also included a means for variably adjusting the amount of tension applied by a fish tugging upon the line in order to trigger the signaling mechanism.

SUMMARY OF THE INVENTION

The present invention provides a rod and reel pole holding and signaling device which may be suitably adjusted to appropriately hold a wide variety of different fishing rods which vary in length and size. The pole holding feature of the invention includes means for variable adjusting the pole holding embodiments to fit the particular rod and reel used with the device. The holding device is also equipped with means of signaling a fisherman when a fish tugs upon a baited fishing line.

The device may be provided in a compact, collapsible and stowable form, and which may be readily erected for use at the fishing site. In the preferred embodiments of the invention, the holding and signaling device includes collapsible legs attached onto a main support frame. A pole holding plate for retainingly holding the butt end of the fishing rod is hinged at one end onto the main frame. A cross bar longitudinally hinged onto the main frame is equipped with a longitudinally extending slot that serves as guideway for an adjustable bracket for carrying a fishing pole barrel and an adjustable triggering mechanism for triggering a signal such as a flagging unit when a fish strikes a baited fishing line. A flag carried by a springed flag staff attached onto the crossbar may appropriately used to signal the fisherman that a strike has occurred. The triggering device may be suitably constructed of a pivotally mounted crank shaft fitted at one end with a line retaining notch and a flag retaining member or hook at an opposite crank shaft end. The triggering mechanism suitably includes means for variably applying tension onto the crank shaft so that the amount of force needed to trigger the signal may be appropriately adjusted to fit the particular fish species being fished by the fisherman. In operation, pressure applied by the fishing line onto the line retaining notch causes the crank shaft to sufficiently pivot to cause displacement of the flag retaining hook to allow for clearance of the flag staff from the retaining hook. The spring attached to the base of the flag staff erects the flag to a flagging position when the triggering mechanism accordingly provides sufficient clearance of the flag staff from the retaining hook. The holding and signaling device is particularly well adapted to open faced spinning reels equipped with a bail.

GENERAL DESCRIPTION OF THE INVENTION

FIGS. 1-8 depict a preferred embodiment of the fish pole holding and signaling device (generally referred to as 1) of this invention. The depicted device is adapted to hold fishing rods P of various sizes outfitted with a spinning reel R.

Figure 5:
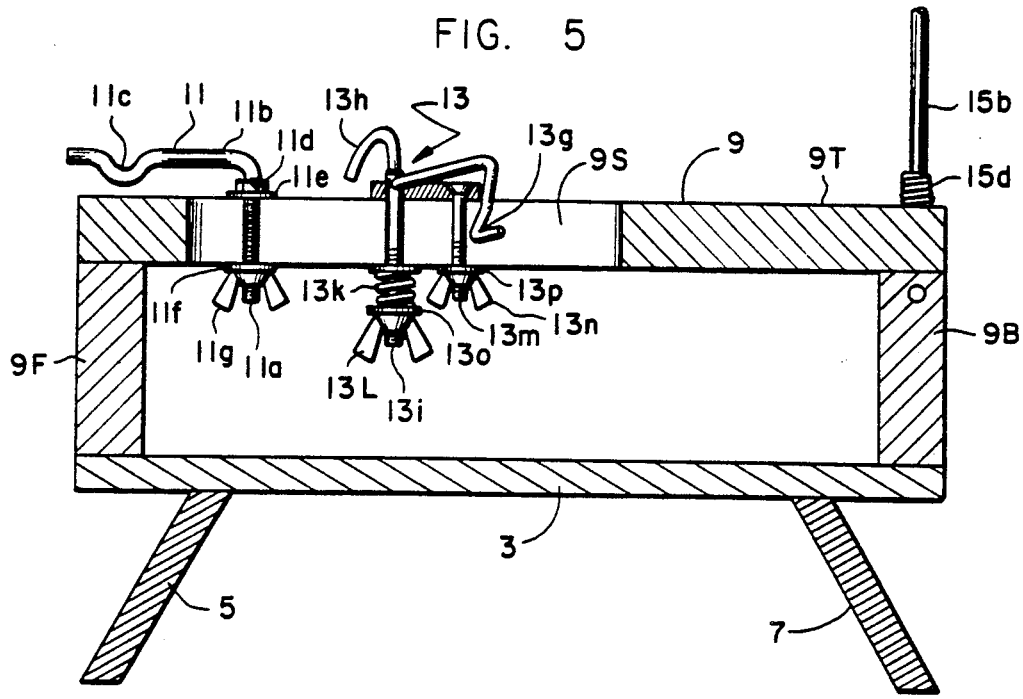
FIG. 5 depicts a cross-sectional view taken along line 5—5 of FIG. 4.
Figure 6:
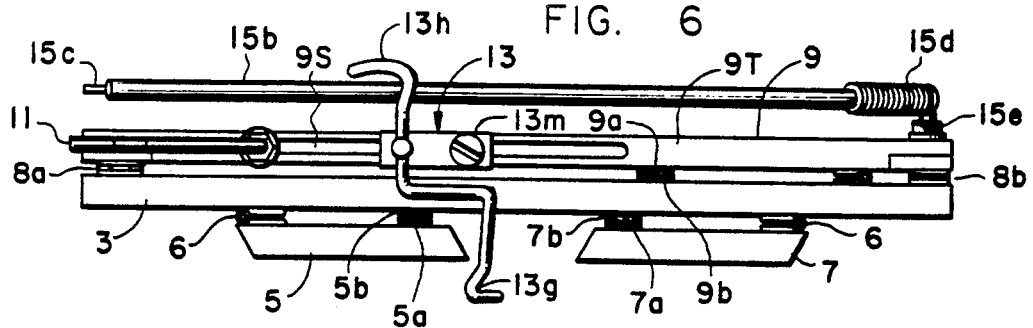
FIG. 6 depicts a side view of the device shown in FIG. 1 in the compacted stowable position.
Figure 7:
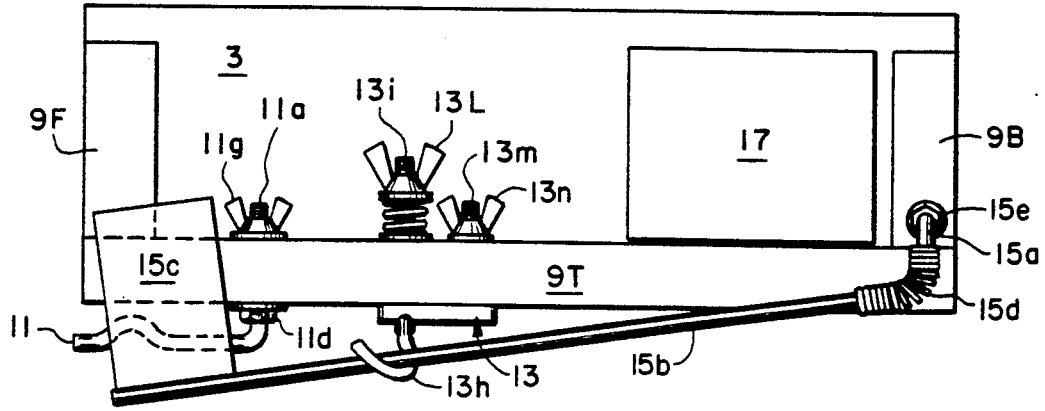
FIG. 7 is a top view of the compacted device shown in FIG. 6.
Figure 8:
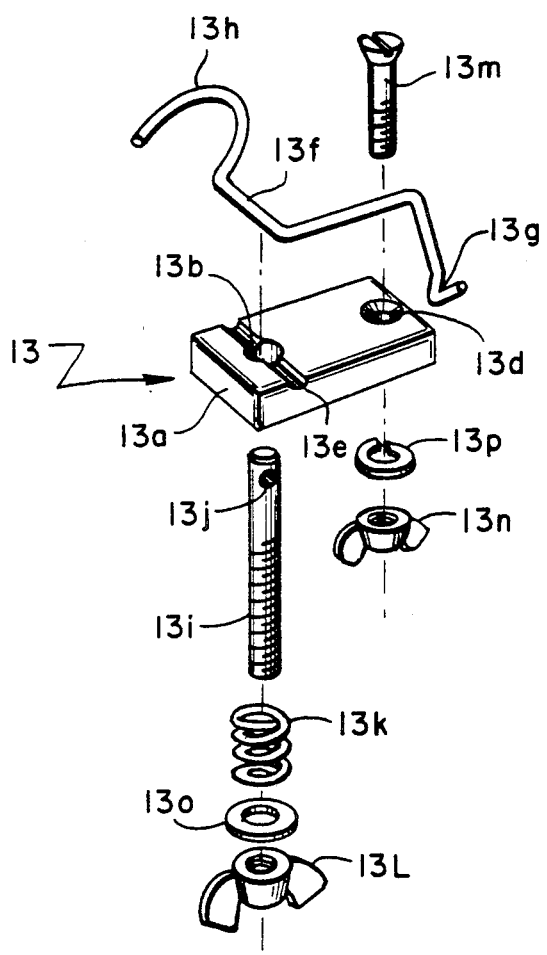
FIG. 8 shows in greater detail a triggering mechanism of the signaling device shown above.

The device I includes a supportive main frame member 3 for holding a fishing pole P equipped with a baited fishing line L and a means for tripping a signal (generally depicted as 13) when a striking game fish tugs upon fishing line L. The depicted device 1 includes a main support frame 3 supported by collapsible legs 5 and 7, a cross-bar (generally designated as 9) for carrying an adjustable fishing pole (e.g. barrel) holding bracket 11, an adjustable signal triggering mechanism 13 and a springed flagging unit 15, and a pole mounting member 17 for holding the fish pole P onto the device 1. Collapsible legs 5 and 7 are secured onto support frame 3 by hinges 6 which permit legs 5 and 7 to be positioned in the erected position as shown in FIGS. 1-5 or in the portable, collapsed and compacted position as depicted in FIGS. 6 and 7.

Interfacing engaging and disengaging strips 5a and 5b and 7a and 7b (e.g. hooked and napped loop fastener combinations such as disclosed in U.S. Pat. Nos. 2,717,437; 3,000,384; and 3,009,285 by VELCRO USA Inc.) respectively secured onto legs 5 and 7 and the undercarriage of frame 3 permit legs 5 and 7 to be engagingly retained onto main frame 3 for transport as shown in FIGS. 6 and 7 or quickly disengaged therefrom by a separating force to provide an erected device as depicted in FIGS. 1-5. Legs 5 and 7 as illustrated in the FIGS. 1-3 and 5-6 are each beveled at the interfacing supportive juncture onto main frame 3 (i.e. along the upper top margin of legs 5 and 7) for purposes of adding stability and strength to the erected device 1 as shown in FIGS. 1-5.

Cross bar 9 extends lengthwise along the upper side margin of support frame 3. Cross bar 9 is also hinged onto frame 3 by hinges 8a and 8b. Interfacing pressure sensitive engaging and disengaging strips 9a and 9b permit the cross bar 9 to be compactly held against the support frame 3 when pressured together for stowing as shown in FIG. 6 and readily disengaged from the cross bar 9 to the erected position as depicted in FIGS. 1-5.

The cross bar 9 serves as a mount for an adjustable pole support brace or bracket (prefixed by 11) and adjusting an adjustable triggering mechanism (generally designated as 13) to fit the particular rod P and reel R combination to be used by the fisherman. The depicted cross bar includes a pair of vertical support beams (front 9F and rear 9B) and a top beam 9T which bridges beams 9F and 9B. Top beam 9T of cross bar 9 has a longitudinal slot 9S which serves as slotted slide for adjusting both the triggering mechanism 13 and pole support bracket 11 along slot 9S and thereby appropriately accommodate the particular size of rod P and reel R fishing rig used in combination with the device 1 of this invention.

Figure 2:
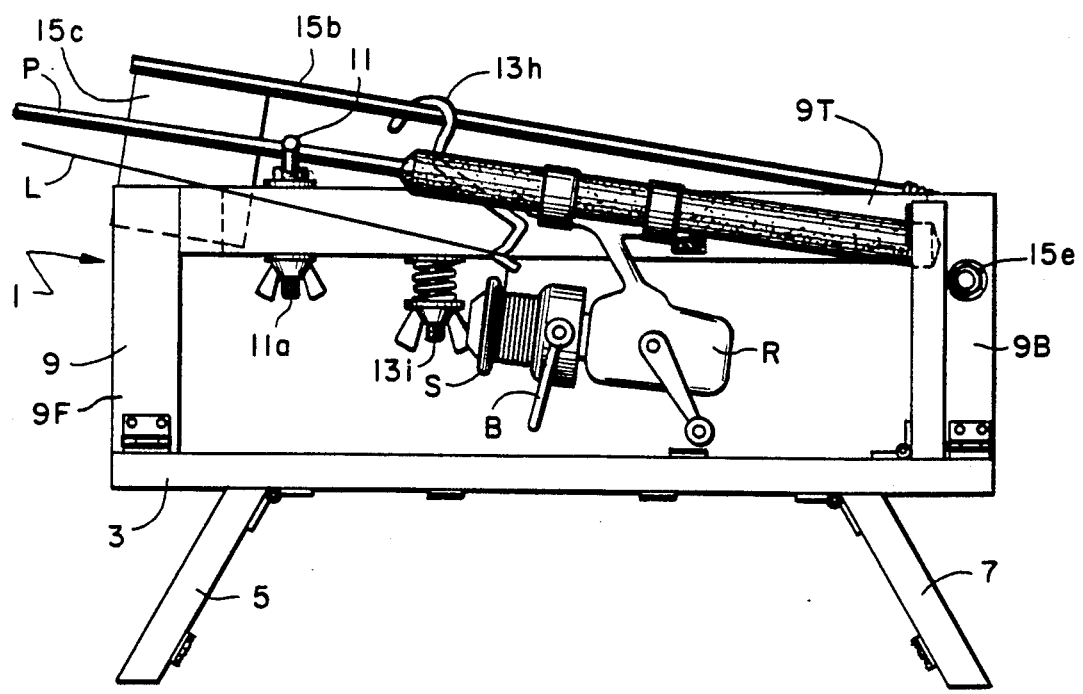
FIG. 2 shows the device of FIG. 1 fitted with a fishing pole.

The pole support bracket 11 (as illustrated in more detail in FIG. 5) may be constructed of a rod stock bent to an appropriate angular configuration (e.g. such as grooved rod stock bent at a right angle) with one leg 11a of the rod stock being threaded and a second angular leg 11b having a grooved channel 11c for supporting a barrel of the fishing rod thereupon. The threaded leg 11a is equipped with an upper nut 11d and washer 11e that permits a vertical adjustment of bracket 11 which in turn interfacially slides along top beam 9T so as to allow for horizontal adjustment along the barrel of pole P as the support bracket 11 is appropriately slideably adjusted along slot 9S. These vertical and horizontal adjustment features permit the device 1 to match onto various different sized fishing poles P. Once support bracket 11 has been properly adjusted in support of fishing pole P, wing nut 11g may be tightened against lower washer 11f so as to securely bolt support brace 11 at a fixed position onto crossbar beam 9T in an appropriate fishing position as illustrated in FIG. 2.

The triggering mechanism 13 may also be slideably adjusted along top beam 9T so as to provide for the appropriate orientation to fit the particular rod and reel to be used in combination therewith. The depicted triggering mechanism 13 includes upper floating plate 13a which bridges slot 9S and slideably rides along top beam 9T as the triggering mechanism 13 is slideably adjusted to an appropriate position for operationally triggering the flagging unit 15. As may be more specifically observed from FIG. 8, the floating plate 13a includes front aperture 13b bored to accommodate shaft retaining bolt 13i, and a rear aperture 13d bored to retain anchoring bolt 13m therewithin. Front aperture 13b includes a notched channel 13e transversely bridging across the face of support plate 13a. Notched channel 13e serves to axially seat crank shaft (generally designated as 13f) onto floating plate 13a.

Figure 3:
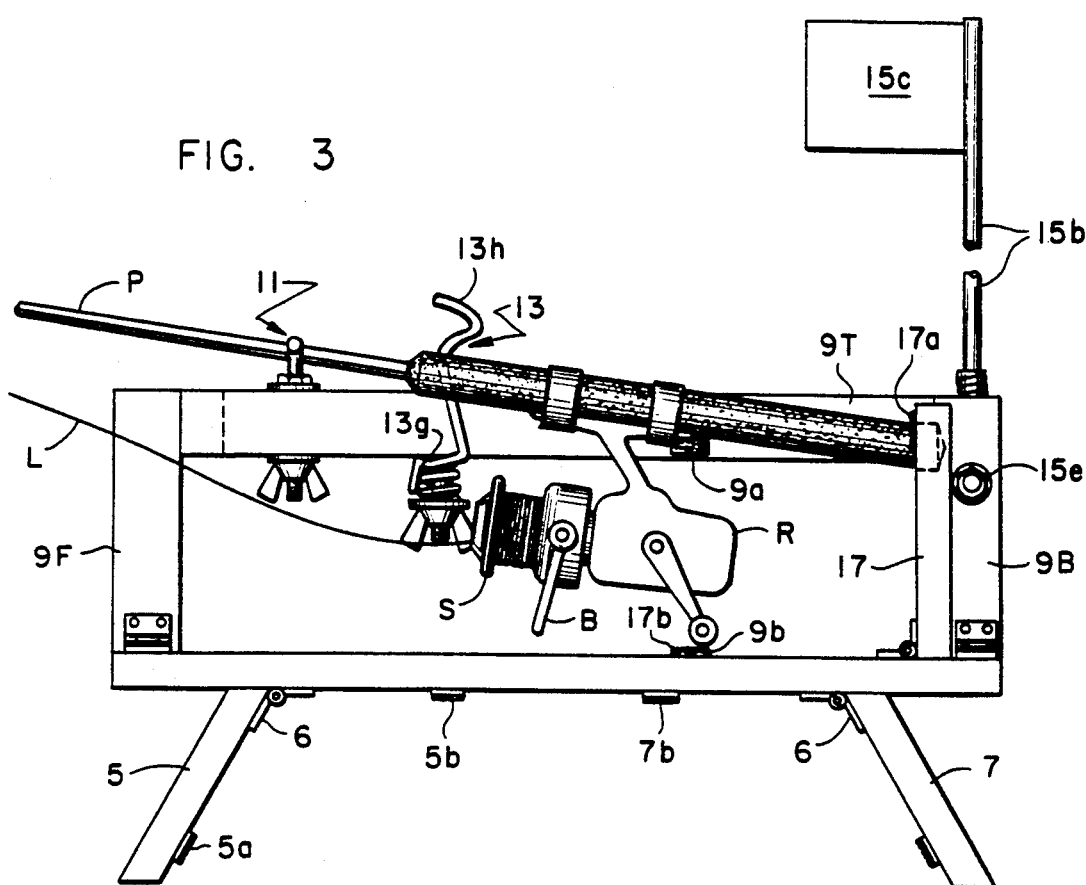
FIG. 3 shows the device of FIG. 2 in a fish strike signaling position.
Figure 4:
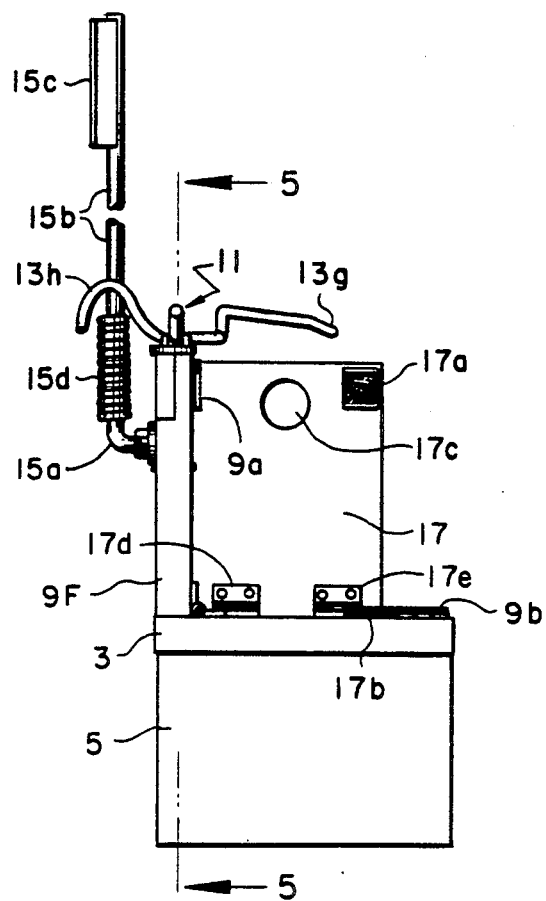
FIG. 4 depicts a front view of the device shown in FIG. 1.

Shaft retaining bolt 13i has been machined to include a shaft retaining bore 13j within which crank shaft 13f is axially mounted. Crank shaft 13f is fitted at one end with a line retaining notch 13g and a flag retaining hook 13h at an opposite shaft end. Retaining notch 13h retains springed flagging unit 15 in an unflagging position (e.g. see FIG. 2) and releases flagging unit 15 when line L triggers the triggering mechanism 13 to pivotally move about its axial mount as shown in FIG. 3. Operationally the triggering mechanism 13 is activated by a striking fish exerting a sufficient force upon fishing line L to create a downward force upon line retaining notch 13g of crank shaft 13f, and cause crank shaft 13f to pivotally rotate sufficiently within shaft retaining bore 13j to trigger the release of springed flagging unit 15 from flag retaining hook 13h as respectively illustrated in FIGS. 2 and 3.

Shaft receiving bolt 13i includes a threaded section opposite from shaft retaining bore 13j. The threaded section of bolt 13i extends through slot 9S and slides within slot 9S as the floating plate 13a and the shaft receiving bolt 13i are slideably adjusted to properly position the line retaining notch 13g and along slot 9S to match the particular rod P and reel R. Once the proper positioning of notch 13g is achieved, the triggering mechanism 13 is tightened onto the slot 9S by tightening wing nut 13n. Tightening wing nut 13L to biases crank shaft 13f onto notched channel 13e.

A journal box or shaft retaining bore 13j at an opposite end of bolt 13i serves as a axial mount for crank shaft 13f. Bore 13j in combination with grooved channel 13e, bolt 13i, and tension spring 13k serve as an adjustable means for regulating the required amount of tension required to trip flagging unit 15. Tension spring 13k biasing against washer 13o operatively secured to bolt 13i will upon tightening of tension wing nut 13L cause a greater biasing and frictional force to be applied against axled portion of crank shaft 13f seated within retaining bore 13j and shaft supporting channel 13e of plate 13a. This increased tension upon shaft 13f increases the amount of required force exerted by a tugging fish against line L retaining notch 13g in order to cause the retained axled portion of shaft 13f to pivotally rotate within shaft retaining bore 13j. Thus by adjusting the tension exerted upon the axled portion of shaft 13f, the amount of required force by a fish tugging upon a fishing line L may be suitably adjusted to range from a light strike for a small pan fish to a heavy strike for a large game fish.

Rear aperture 13d of plate serves to retain anchoring bolt 13m and thereby anchor floating plate 13a onto top beam 9T by the tightening wing nut 13n and washer 13p onto bolt 13m.

The triggering mechanism 13 depicted in the figures includes line retaining notch 13g in the unactivated or non-flagging position which retainly supports fishing line L as illustrated in FIG. 2 and releases the fishing line L upon activation of the triggering mechanism 13 to the flagging position as shown in FIG. 3. This hold and release attribute constitutes a definitive beneficial advantage of this device over the prior art devices. The release attribute allows the striking fish to take the bait without creating a drag on line L and for the fisherman to properly set the hook onto a striking fish. These features combined with the ability to adjust the rod holding attributes and the triggering mechanism 13 to match different rod and reel sizes enables the device 1 herein to be adjustable for a wide range and variety of open-faced spinning gear.

The ability to regulate the amount of tension needed to trip the flagging unit also allows the triggering mechanism to be variably adjusted to meet the type of bait.

Certain baits such as artificial lures, small minnows, worms, etc. will create little, if any, exerted force upon the fishing line. A relatively small amount of tension may be placed upon shaft 13f when these types of baits are used for pan fishing. In contrast, a baited line with a relatively large and active bait for use in large game fishing may require a setting at a substantially higher tension level upon shaft 13f.

Figure 1:
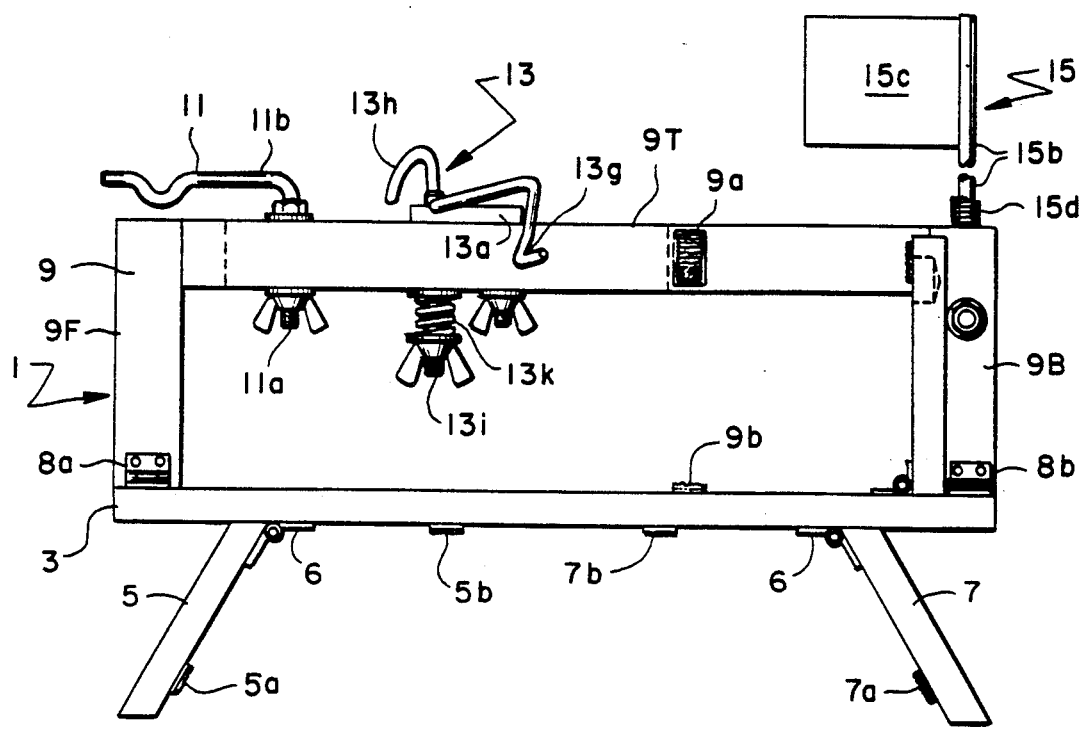
FIG. 1 depicts a side view of the pole holding and signaling device of this invention.

Bent bolt 15a fastened to vertical support beam 9B by tightened nuts 15e serves to support the signaling unit (generally prefixed by 15) which is depicted as a springed flagging unit 15 in the drawings. The internal diameter of flag spring 15d is sized to tightly bias onto bent bolt 15a and flag staff 15b. Spring 15d imparts flexibility to flag staff 15b and its attached flag 15c. Spring 15d permits flag staff 15b to be held in the non-signaling position by the hooked flag staff retainer 13h as shown in FIGS. 2, 6, and 7 and sprung onto the signaling position when released therefrom as illustrated in FIGS. 1, 3, and 5. Other means for providing a flexible shaft such as flexible plastic, metal, fiberous materials, etc. may also be utilized as a replacement for flag spring 15d. Alternatively, the springed flagging unit 15 may, if desired, be replaced with other types of mechanically activated signals such as by releasing a hammer or clapper striking against a bell housing or a mechanically activated switch for sounding an audio or visual alarm. The depicted flagging unit 15 represents the preferred embodiment of the invention by reason of its simplicity, durability, and ease to maintain.

The holding and signaling device depicted in the drawings is particularly well suited for use in combination with a open-faced spinning reel R equipped with a bail B. The triggering mechanism 13 as depicted in the figures may be slideably adjusted along top beam 9T to match the various different types of rod and reel combinations. As illustrated in FIG. 2, it is operationally important for line retaining notch 13g to be adjusted so that it is positioned behind the face of spool S. If the retaining notch 13g is positioned too far forwardly, the fishing line L upon a tug or strike by a fish will merely drop from the notch 13g and thereby fail to exert the necessary pressure upon shaft 13f to cause shaft 13f to pivot within journal box 13j sufficient to cause flag retaining hook 13h to clear springed flag pole staff 15b which in turn will cause flag spring 15d secured to rear cross bar 3 to springingly erect flag staff 15b and flag 15c as shown in FIGS. 1, 3 and 5. Timing of the release of the flagging unit 15 may also be varied by the positioning of the triggering assembly 13 in relation to the face of reel R. Moving the trigger assembly forward will delay the release of the flagging unit 15 while a more rearward positioning will hasten its release. The triggering mechanism 13 generally provides for a concurrent release of the fishing line L and the flagging unit 15.

A rear brace 17 attached to the top side of frame support 3 by hinges 17d and 17e serves to bracely retain cross bar 9 in an upright position and as a mount for retainingly holding a butt end of a fishing pole P. Rear brace support 17 includes a pole supporting aperture 17c for inserting and retaining a fishing pole P butt end therewithin. Similar to the collapsible legs 5 and 7 and cross bar 9, rear brace 17 is equipped with a pressure engaging tape strips 17a and 17b for interfacially engaging brace 17 onto frame 3 when rear brace support 17 is collapsed to a stowable position as depicted in FIGS. 6 and 7. The rear brace 17 and the adjustable front brace 11 permit the device 1 to be appropriately adjusted to the rod P size and placed in a proper fishing position for signaling a strike as illustrated in FIG. 2.

The device 1 may be constructed of wide variety of materials (e.g. plastic, metals, woods, etc.) possessing sufficient structured strength for this intended use and purpose. In the depicted device the triggering mechanism 13, hinges (e.g. 6, 8a, 8b, 17d, and 17e), front pole brace support 11, flag mount (15a and 15e), and flag staff spring 15d are of a metal construction. The flag 15c may be suitably made of cloth.

What is claimed is:

1. A fish pole holding and signaling device which provides a signal to a fisherman when a striking fish strikes a baited fishing line attached to a fishing pole held by said device, said device comprising:
   A) means for retainingly holding the fishing pole equipped with said fishing line;
   B) a flagging unit for providing the signal upon activation by the striking fish; and
   C) an adjustable triggering member equipped with:
      a) means for mechanically retaining the flagging unit in a non-signaling state until activated to a signaling position by the striking fish;
      b) means for transferring a force generated by the striking fish upon the fishing line to a mechanical movement of the triggering member; and
      c) signal activating means for converting the mechanical movement of the triggering member to a signaling position by a mechanical release of the flagging unit therefrom.

2. The device according to claim 1 wherein the adjustable triggering member comprises a pivotally mounted crank shaft section fitted with a line engaging section at one shaft end and a signal retaining section at the opposite end of the crank shaft section.

3. The device according to claim 2 wherein the line engaging section and the signal retaining section are positionally affixed to the crank shaft section at a sufficient offset relationship to permit the line engaging section to transfer the force of the striking fish to the signal retaining section and cause the signal retaining section to release the flagging unit to the signaling position.

4. The device according to claim 3 wherein the line engaging section comprises a line retaining notch upon which the fishing line may be emplaced and released therefrom upon the mechanical movement of the triggering member.

5. The device according to claim 4 wherein the pivotally mounted shaft includes means for variably adjusting the tension upon the shaft and thereby altering the force required by the striking fish in order to cause the movement of the shaft section.

6. The device according to claim 2 wherein the fishing line engaging section comprises a notched region for placement of the fishing line thereupon and release of the fishing line therefrom upon pivotal movement of said pivotally mounted crank shaft section.

7. The device according to claim 6 wherein the triggering member includes means for variably adjusting and positioning the triggering member along a plane aligning onto a major axis of the fishing pole as held by said device.

8. The device according to claim 2 wherein the means for retainingly holding the pole includes an adjustable bracket which may be variably adjusted along a barrel of the fishing pole and a butt holder for holding onto a butt end of the fishing pole.

9. The device according to claim 1 wherein the triggering member includes a pivotally mounted crank shaft section equipped with a line engaging section for transferring the force of the striking fish to mechanical movement of the shaft section sufficiently to cause the fishing line to be released from said line engaging section.

10. The device according to claim 9 wherein the pivotally mounted crank shaft section includes means for variably adjusting tension upon said crank shaft section so as to vary the force required by the striking fish to cause the pivotal movement of said shaft section.

11. The device according to claim 1 wherein the flagging unit includes a flexible flag staff of sufficient flexibility to be held in a non-flagging position when retained in the non-signaling state and flexed a substantially vertical position by the mechanical release thereof.

12. The device according to claim 11 wherein the mechanical release of the flagging unit comprises a hook operatively connected to a pivotally mounted crank shaft section.

13. The device according to claim 12 wherein the pivotally mounted crank shaft includes a fishing line engaging section affixed onto the crank shaft section at an off-set relationship to said hook.

14. The device according to claim 8 wherein the force of the striking fish upon said fishing line engaging section provides sufficient torque upon the shaft to allow the hook to release the flagging unit and thereby provide the signal of the striking fish.

15. A fish pole holding and signaling device adapted to hold a fishing pole fitted with a baited fishing line in a fishing position and to signal a fisherman of a fish strike to the baited line, said device comprising:
   A) means for holding the pole in the fishing position;
   B) a flagging unit which provides a triggered signal to the fisherman of the fish strike;
   C) an adjustable signal triggering member driven by a torqued force with said triggering member being equipped with:
      a) a fishing line engaging section equipped with means for converting a force generated by the fish strike upon said line to the torqued force for powering the triggering member; and
      b) signal activating means for providing the triggered signal with said activating means being operationally responsive to the torqued force and triggering the flagging unit to the triggered signal in response to the torqued force thereupon.

16. The device according to claim 15 wherein the signaling unit comprises a flexible shafted flagging unit which flexes to a flagging position in response to the torqued force upon said triggering member.

17. The device according to claim 15 wherein the triggering member comprises a pivotally mounted crank shaft section equipped at one shaft end with a signal retaining section for retaining the flagging unit in a non-signaling position and a line engaging section at an opposite shaft end which upon being driven by the torqued force releases the fishing line from said line engaging section.

18. The device according to claim 17 wherein the flagging unit comprises a flexible shafted flagging unit and the signal retaining section comprises a hook which upon mechanical movement of the pivotally mounted shaft section by the torqued force allows the hook to release the flagging unit to a flagging position.

19. A method of fishing with a fish pole holding and signaling device adapted to hold a baited fishing line in a fishing position and to signal a fisherman of a fish strike wherein said device includes means for holding the pole in the fishing position, a flagging unit for providing a triggered signal to the fisherman of the fish strike and a pivotally mounted triggering member equipped at one end with a signal retaining section for retaining the flagging unit in a non-signaling state until activated to a signaling position by the fish strike and a line engaging section at an opposite end of the triggering member, with said line engaging section being equipped with means for converting a force generated by the fish strike upon said line to a torqued force for powering the triggering member to the signal positioning and means for releasing said line from said line engaging section upon powering said triggering member to the signaling position, said method comprising:
   a) placing within said device the fishing pole equipped with the baited line in the fishing position;
   b) positioning the triggering member at the non-signaling state by retainingly securing the signaling unit onto the signal retaining section and positionally emplacing the baited fishing line onto the line engaging section so that the force generated by the striking fish exerts the torqued force upon the triggering member to cause the signal retaining member to release the signaling unit to the signaling position and the line engaging section to release the baited fishing line therefrom; and
   c) retrieving the baited line upon activation of the flagging unit to the signaling position by the striking fish.

20. The method according to claim 19 wherein the flagging unit is retainly held at the non-signaling state by the triggering member which includes a pivotally mounted crank shaft section fitted at one end with a signal retaining section comprising a hook retainingly holding the flagging unit until released therefrom by a pivotal movement of the pivotally mounted crank shaft section.

* * * * *